Nov. 20, 1923.
A. J. MACY
1,475,075
LANDING INDICATOR FOR AIRPLANES
Filed July 10, 1918      6 Sheets-Sheet 1
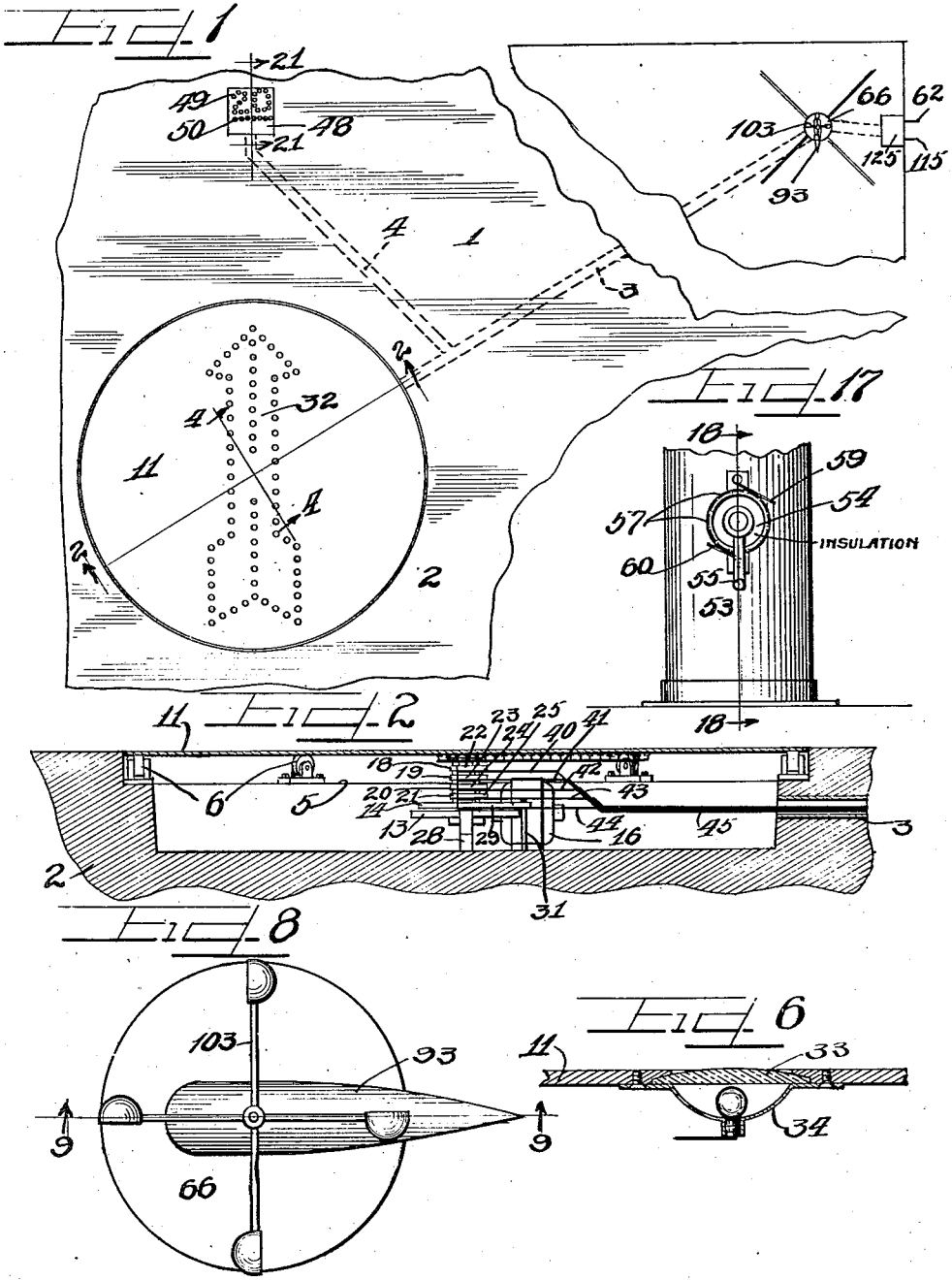

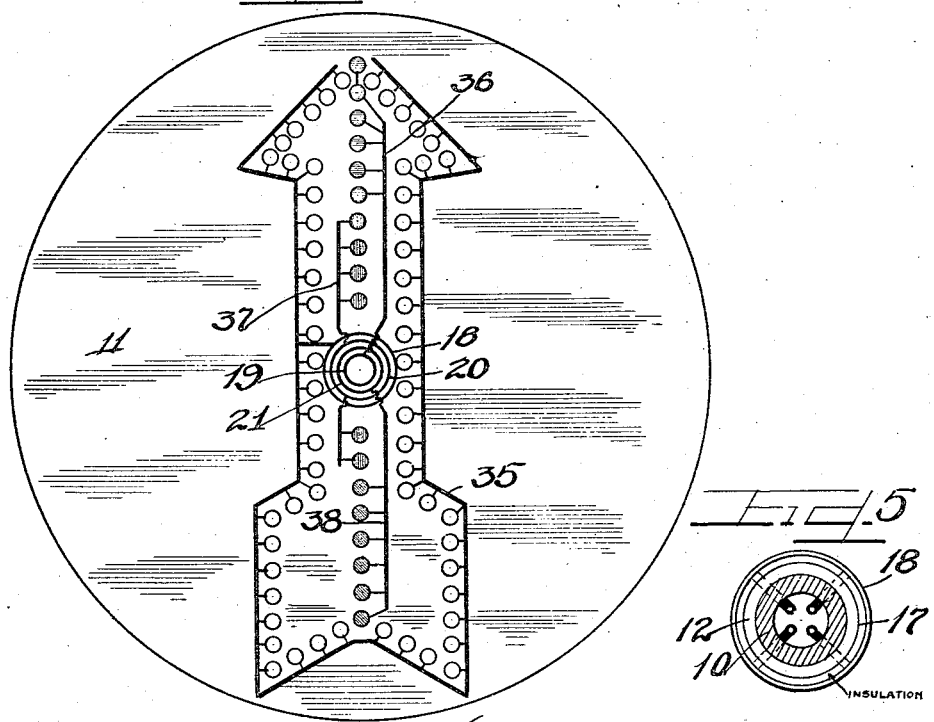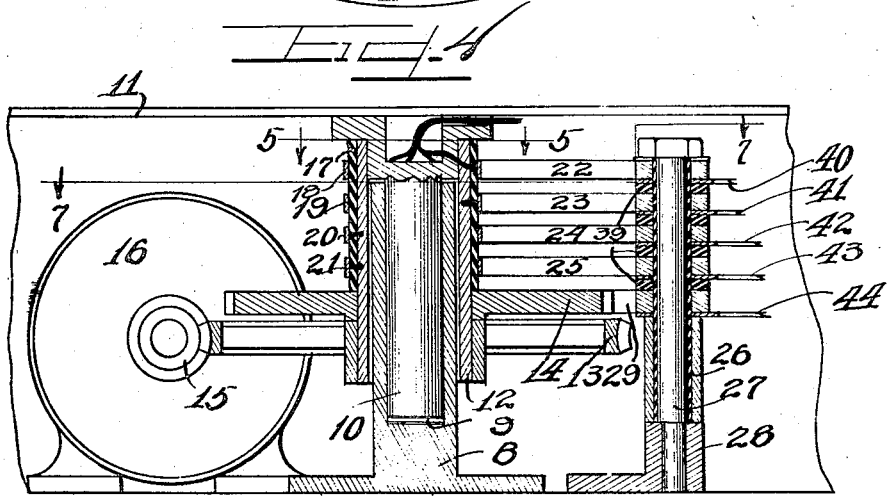

Nov. 20, 1923. 1,475,075
A. J. MACY
LANDING INDICATOR FOR AIRPLANES
Filed July 10, 1918  6 Sheets-Sheet 3
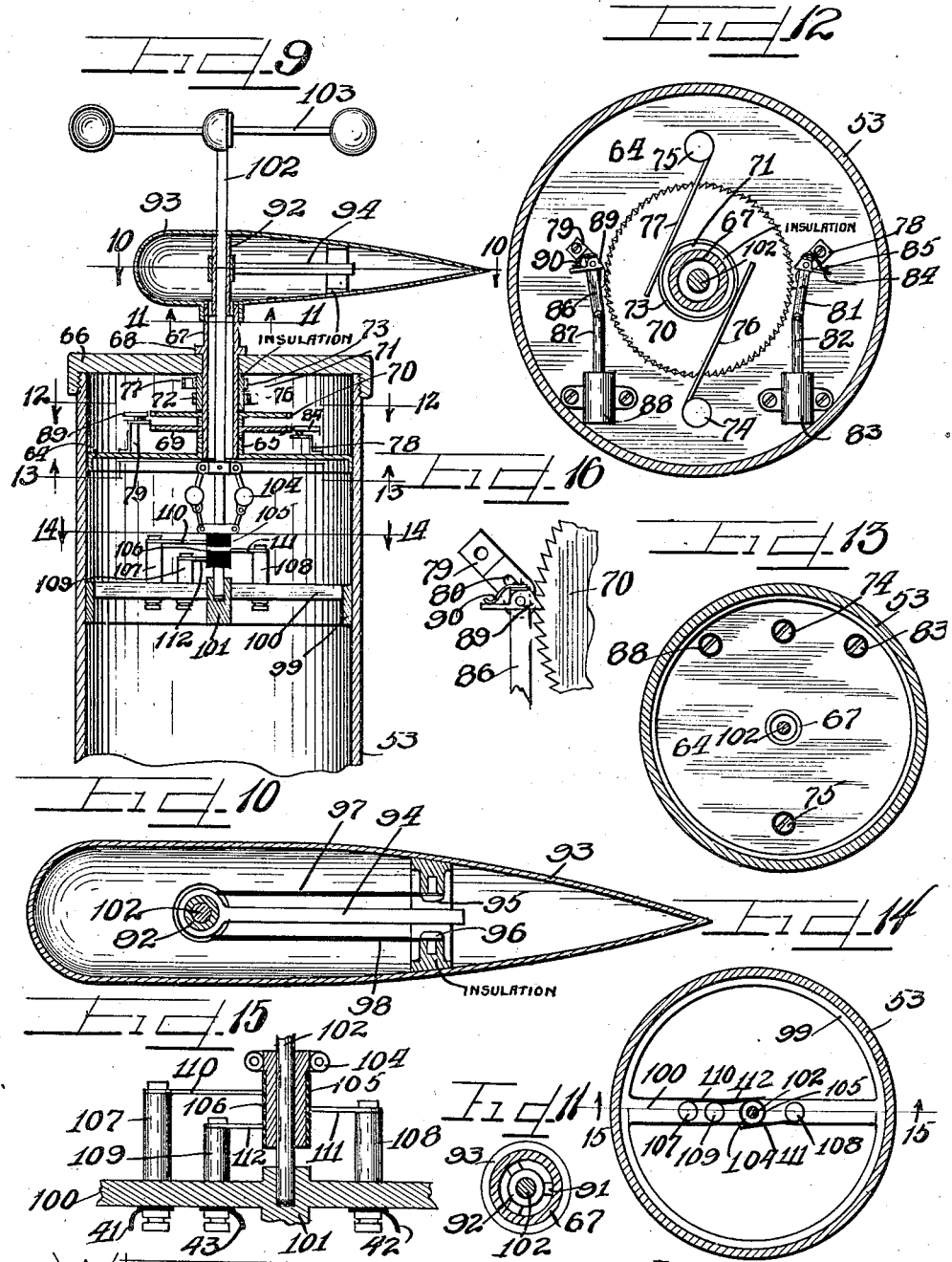

Nov. 20, 1923
A. J. MACY
1,475,075
LANDING INDICATOR FOR AIRPLANES
Filed July 10, 1918    6 Sheets-Sheet 4
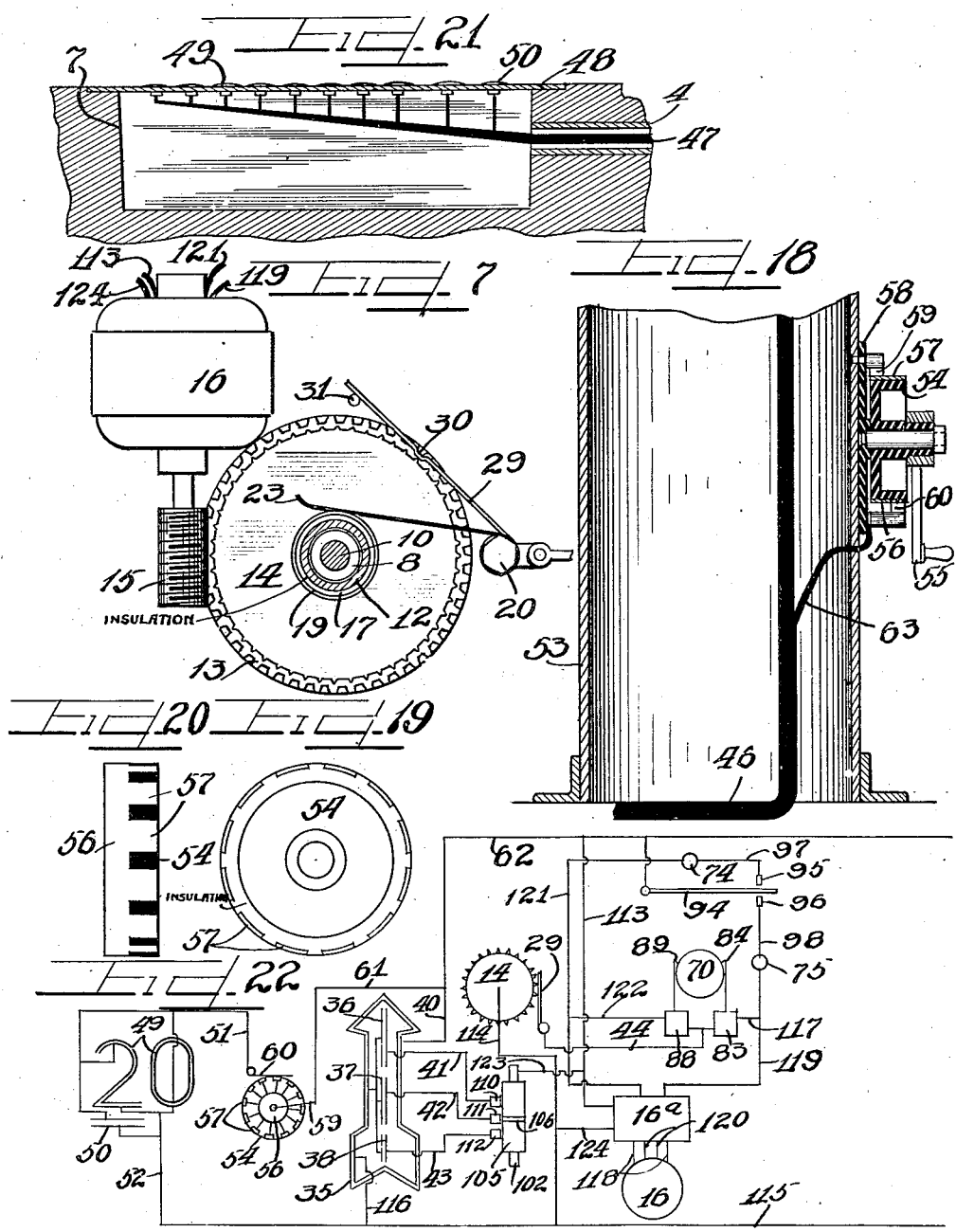

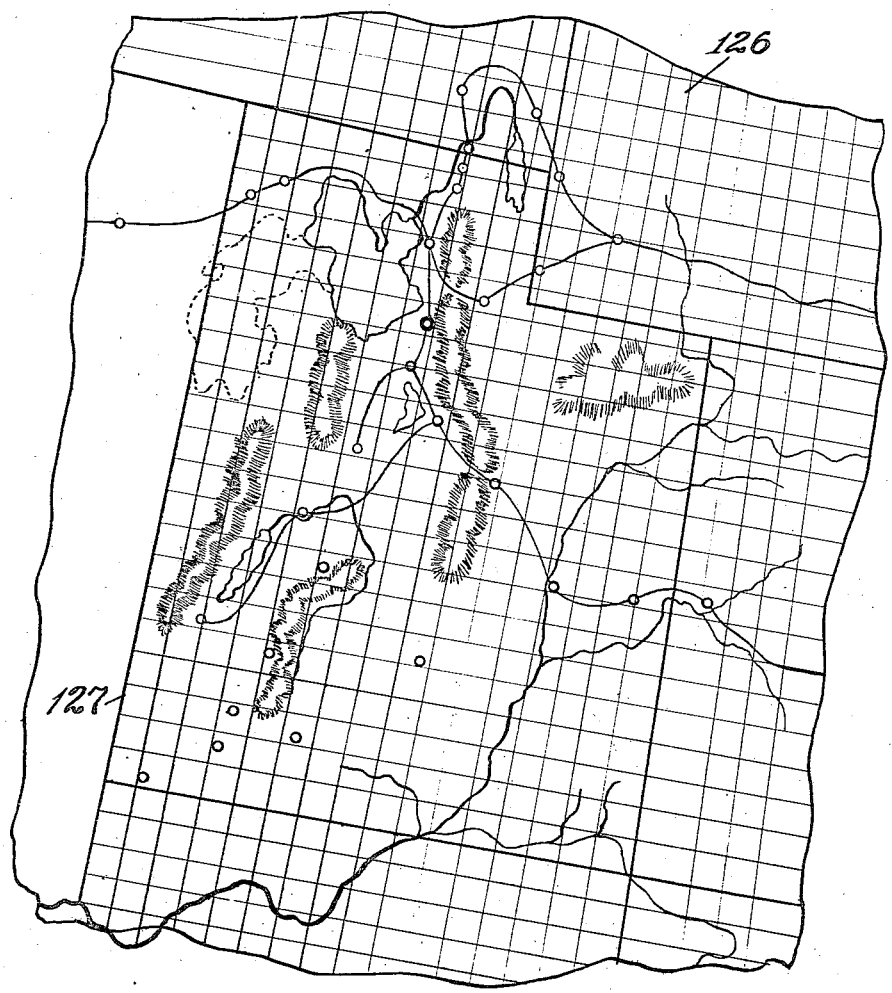

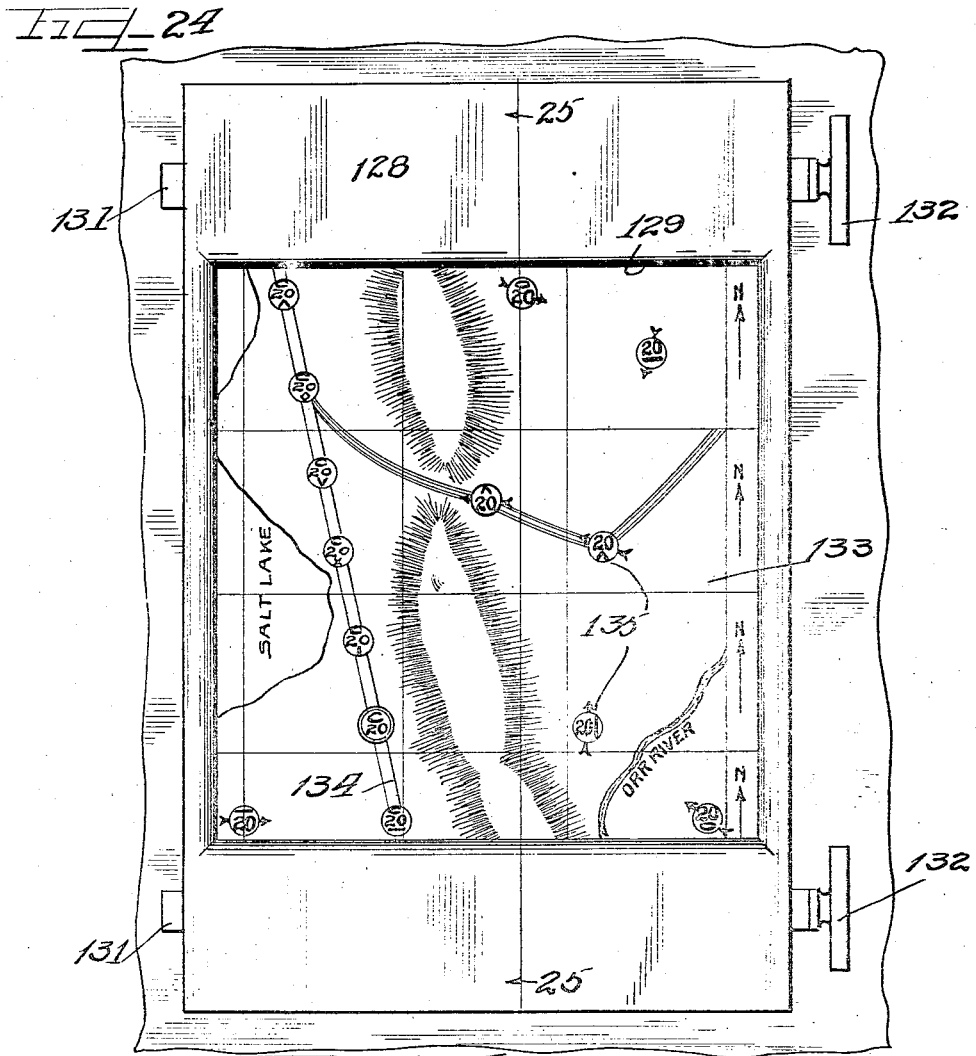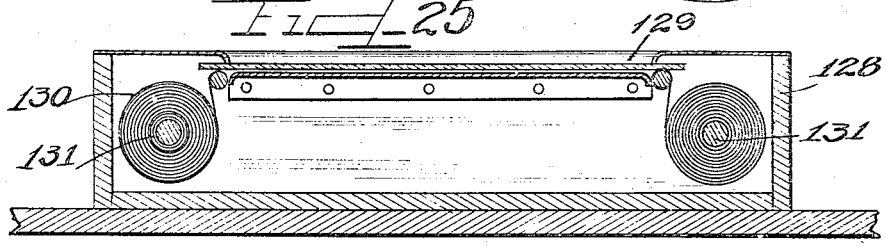

Patented Nov. 20, 1923.

1,475,075

UNITED STATES PATENT OFFICE.

ALFRED JOHN MACY, OF FRANKLIN, PENNSYLVANIA.

LANDING INDICATOR FOR AIRPLANES.

Application filed July 10, 1918. Serial No. 244,311.

*To all whom it may concern:*

Be it known that I, ALFRED JOHN MACY, a citizen of the United States, and a resident of the city of Franklin, in the county of Venango and State of Pennsylvania, have invented certain new and useful Improvements in a Landing Indicator for Airplanes; and I do hereby declare that the following is a full, clear, and exact description of the same, reference being had to the accompanying drawings, and to the numerals of reference marked thereon, which form a part of this specification.

It is well known that the best way to make a successful landing in an airplane is to head the same into the wind. Due, however, to the fact that the direction and velocity of the wind at different altitudes may vary considerably from the direction and velocity of a ground or surface wind, aviators oftentimes experience considerable difficulty in ascertaining the direction and velocity of the wind over a field, particularly so at night when it becomes necessary to also try and locate a suitable landing spot.

This invention relates to a wind controlled automatically actuated device positioned in a suitable landing area and equipped with means for indicating a cardinal direction and designating the location of the landing area and whether the area is clear for landing, said device is furthermore adapted to afford a landing platform which is provided with means for readily locating the same by day or by night, and also indicating the direction and approximate velocity of the surface wind to aid an aviator in making a successful landing by heading directly into the wind.
It is an object of this invention to provide a landing indicator for airplanes.

It is also an object of the invention to provide a means for automatically indicating the direction and approximate velocity of the wind to assist aviators in making landings.

Another object of the invention is the construction of an airplane landing indicator adapted to afford a suitable landing platform provided with a means for indicating the direction and velocity of the wind.

A further object of the invention is the construction of a wind controlled mechanism adapted to automatically rotate a landing platform to properly designate the direction of the surface wind.

Another object of the invention is the construction of an airplane landing mechanism adapted to indicate a cardinal direction, and the direction and approximate velocity of a surface wind blowing over said mechanism.

It is also an object of this invention to provide an airplane landing indicator equipped with means for indicating a cardinal point, identifying a landing station, and indicating whether said station is clear for landing or whether it is obstructed.

A further object of the invention is the construction of an airplane landing indicator embodying a landing platform having means associated therewith for notifying an aviator as to whether the field is clear for landing or not, designating the direction and velocity of a wind over the field, giving a cardinal direction and also the relative geographical location of the indicator, and further serving as a route unit to assist an aviator in following a certain course or helping him to readily find his bearings when lost.

It is furthermore an object of this invention to provide a wind controlled electrical mechanism adapted to automatically rotate a landing platform into a position to indicate at night by illuminated means the direction and velocity of the surface wind and the location of the platform or suitable airdrome or landing field.

It is an important object of the invention to provide a simple and effective means for giving an aviator information to facilitate the making of a safe landing, and information whereby he can readily determine his bearings.

Other and further important objects of this invention will be apparent from the disclosures in the drawings and specification.

The invention (in a preferred form) is illustrated in the drawings and hereinafter more fully described.

On the drawings:

Figure 1 is a top plan view of a field equipped with a landing indicator embodying the principles of this invention.

Figure 2 is an enlarged section taken on line 2—2 of Figure 1, showing parts in elevation.

Figure 3 is an enlarged bottom plan view of a turntable showing the wiring arrangement of the indicating means mounted thereon.

Figure 4 is an enlarged detail section taken on line 4—4 of Figure 1.

Figure 5 is a sectional view taken on line 5—5 of Figure 4, with parts omitted.

Figure 6 is an enlarged detail section taken through a portion of the turntable with one of the lamps thereon shown in elevation.

Figure 7 is a sectional view taken on line 7—7 of Figure 4.

Figure 8 is an enlarged top plan view of the wind controlled mechanisms.

Figure 9 is a detail section taken on line 9—9 of Figure 8, with parts broken away and with parts in elevation.

Figure 10 is an enlarged section taken on line 10—10 of Figure 9.

Figure 11 is an enlarged detail section taken on line 11—11 of Figure 9.

Figure 12 is an enlarged section on line 12—12 of Figure 9.

Figure 13 is a section taken on line 13—13 of Figure 9.

Figure 14 is a section taken on line 14—14 of Figure 9.

Figure 15 is a detail section taken on line 15—15 of Figure 14.

Figure 16 is a fragmentary detail view of the pawl and ratchet wheel mechanism shown in Figure 12.

Figure 17 is an elevational view of the lower portion of the pedestal supporting the wind controlled mechanisms.

Figure 18 is an enlarged section taken on line 18—18 of Figure 17.

Figure 19 is an enlarged front view of a wheel switch.

Figure 20 is a side view thereof.

Figure 21 is an enlarged section taken on line 21—21 of Figure 1.

Figure 22 is a wiring diagram of the device.

Figure 23 is a fragmentary portion of an aviation map.

Figure 24 is a plan view of an airplane map casing adapted to disclose enlarged detail portions of the aviation map.

Figure 25 is a reduced section taken on line 25—25 of Figure 24.

As shown on the drawings:

The reference numeral 1, indicates an aviation or flying field excavated in a flat or level portion thereof to afford a basin having the sides and bottom thereof provided with a covering of concrete or other suitable material to form a pit or casing 2. A conduit or tunnel 3, is laid or buried in the field and has one end thereof opening into the casing 2, and the other end closed. Communicating through one side of the conduit 3, is one end of a buried conduit or tunnel 4. The casing 2, is of circular form and is provided with a peripheral ledge or shelf 5, upon which are rotatably mounted a plurality of rollers 6. The other end of the conduit 4, opens into a casing or box 7, which is disposed in a cardinal position, in this case, directly north of said casing 2.

Rigidly mounted centrally upon the floor of the casing 2, is a hollow standard 8, having a ball bearing mechanism 9, disposed therein upon which the lower end of a vertical shaft 10, rotatably rests. Mounted upon the upper end of the shaft 10, is a large circular landing platform or turntable 11, of a diameter slightly less than that of the upper portion of the casing 2. As clearly shown in Figures 1 and 2, the turntable 11, closes the casing and rests upon the rollers 6. Secured centrally to the bottom of the turntable 11, is a downwardly directed sleeve 12, which telescopes over the standard 8, and has rigidly secured on the lower end thereof a worm gear 13, and a switch gear 14. Meshing with the worm gear 13, is a driving worm 15, which is rigidly secured on one end of the shaft of a single phase induction motor 16, conveniently mounted within the casing 2, and equipped with a reversing switch mechanism 16ᵃ, as indicated in the wiring diagram, to which the terminals of the stator winding and the split phase starting winding are connected. Disposed around the upper portion of the sleeve 12, is an insulating collar 17, upon which are secured four collector or contact rings numbered 18, 19, 20 and 21, respectively. Frictionally contacting the contact rings 18, 19, 20 and 21 are brushes 22, 23, 24 and 25, respectively, mounted upon the upper portion of an insulating sleeve 26, engaged around a stem or rod 27, supported by a standard 28, rigidly secured upon the floor of the casing 2. Also mounted upon the insulating sleeve 26, is a brush 29, provided with a projection 30. The outer end of the brush 29, rests against a pin 31, to hold the brush 29, tangentially with respect to the switch gear 14, to permit the projection 30, to be contacted only by one tooth at a time.

As clearly shown in Figures 1 and 3, the turntable 11, is provided with a plurality of apertures arranged in the form of a longitudinally ribbed arrow 32, which projects diametrically across the turntable. Each of the turntable apertures may be closed as shown by means of a glass lamp cap or lens 33, which is held in position by a reflector socket 34, secured to the inner surface of the turntable and affording a means for supporting an electric lamp below the lamp cap. The lamps forming the arrow 32, are divided into four independent groups with the lamps of each group connected in parallel. The main group of lamps forms the outline of the arrow 32, and is represented by the reference numeral 35. As hereinafter more fully described, the direction of the arrow indicates the direction in which the wind is blowing. The lamps which are longitudinally aligned in the center of the arrow are the wind velocity indicating lamps and comprise a head or high velocity group 36, a middle or moderate velocity group 37, and a tail, or low velocity group 38, disposed in the head, middle and tail of the arrow respectively as clearly shown in Figure 3. The lamp groups 35, 36, 37 and 38, are connected with the contact rings 18, 19, 20 and 21, respectively. The lamps in the groups 35, 36, 37, and 38, are of different colors to permit the groups to be readily distinguished from one another. The lamps in group 35, are white, those of group 36, are red, while the lamps of group 37, are yellow, and those of group 38, are green. It will, of course, be understood that any combination of colors other than those above mentioned may be used, and that the shape and arrangement of the groups may also be changed if desired. If preferred the lamp caps or lenses 33, may be of different colors instead of using colored lamps.

As clearly shown in Figure 4, the brushes 22, 23, 24, 25 and 29, are separated from one another by insulating washers 39. Wires 40, 41, 42, 43 and 44, are respectively connected to the brushes 22, 23, 24, 25 and 29. The wires 40 to 44, inclusive, form a cable branch 45, which is run into the conduit 3, and forms a part of a main cable 46, in said conduit. The main cable 46, is provided with another branch cable 47, which is run in the conduit 4, and extends into the box or casing 7, as shown in Figure 21. The casing 7, is covered by a plate or platform 48, provided with a plurality of openings or apertures each equipped with a lens or lamp cap, a socket and an electric light, similar to the arrangement shown in Figure 6. The lamps on the cover plate 48, are arranged in groups, one group 49, forming the number 20, and the other group 50, forming a bar or other suitable symbol disposed transversely below the bottom of the number 20. The symbol 20, designates the sectional or territorial district in which the particular field is located, and the bar is an emblem designating the particular field in said district or territory, thereby affording a ready means whereby an aviator can determine his particular geographical location. It will be understood, however, that the numbers or symbols on the plate 48, will vary depending upon the geographical location and the route. The lamps in group 49, forming the symbol 20, are white and the lamps in group 50, are red. Of course different color combinations may be used if desired, and the lamps in said groups 49 and 50 may be arranged to form other emblems than those described. The emblem formed by the lamp group 49, will be the same for all of the aviation landing fields or stations in a particular territory or district, while the emblem formed by the lamps of group 50, will be different for each of the stations in a given territory or district. The lamps of groups 49 and 50, are arranged in parallel and are connected across wires 51 and 52, which form the branch cable 47.

Mounted in a convenient position in another portion of the aviation field 1, and at the other end of the conduit 3, is a vertical hollow post, standard or pedestal 53, having rotatably mounted on the exterior thereof an insulating switch ring or wheel 54, adapted to be manually operated by means of a crank or handle 55, and having secured around the periphery thereof a metal contact rim or band 56, provided with a plurality of peripheral teeth or lugs 57, integrally formed around one margin thereof and insulated from one another as shown in Figure 20. Mounted upon an insulating plate 58, on the exterior of the pedestral 53, is a brush 59, having the free end thereof resting upon or contacting the contact rim 56, and a brush 60, the free end of which is disposed to intermittently contact the teeth 57. The brush 60, has the wire 51, connected therewith, while the brush 59, has one end of a wire 61, attached thereto, the other end of which is connected to a line or power wire 62. The wires 51 and 61, form a branch cable 63, of the main cable 46.

Rigidly secured horizontally within the pedestal 53 and near the upper end thereof is a centrally apertured plate, partition or shelf 64, provided with an upwardly directed collar 65. A centrally apertured cap 66, is removably secured upon the upper end of the pedestal 53, to close the same, and projecting downwardly through the center of said cap is a rotatable sleeve 67, the lower end of which extends through the collar 65, of the plate 64, while the upper end of said sleeve extends above the cap 66, and is provided with a ring flange 68, which rests upon the cap 66, to hold the sleeve in position. Secured upon the sleeve 67, and resting upon the collar 65, is a lower toothed disk or ratchet-wheel 69, and resting thereon and also rigidly secured to the sleeve 67, is an upper toothed disk or ratchet-wheel 70, having the teeth thereof pointing in a direction opposite to that of the teeth on the ratchet-wheel 69. Secured on the sleeve 67, between the upper gear wheel 70, and the cap 66, is an insulating collar or tube 71, having rigidly secured thereon a lower contact ring 72, and an upper contact ring 73, separated from one another. Mounted upon opposite sides of the plate 64, are posts 74 and 75, having brushes 76 and 77, respectively, mounted thereon, with the brush 76, contacting the contact ring 72, and the brush 77, contacting the contact ring 73.

Rigidly mounted upon opposite sides of the plate 64, are Z-supports or brackets 78 and 79, each provided with a slot 80, in the upper horizontal arm thereof. The bracket 78, is shorter than bracket 79, and has slidably engaged in the slot 80, thereof a pin secured on one end of a link 81, the other end of which is pivotally connected with the core 82, of a solenoid 83, mounted upon the plate 64. Pivotally mounted upon the link 81, is a pawl or ratchet 84, which is disposed in the plane of the ratchet-wheel 69, and is engaged by a spring 85, secured on the end of the link 81, for normally holding the ratchet 84, in released or retracted position out of engagement with the ratchet-wheel 69. The bracket 79, has slidably engaged in the slot 80, thereof a pin secured on one end of a link 86, the other end of which is pivotally connected with the core 87, of a solenoid 88, mounted upon the plate 64. Pivotally mounted upon the link 86, is a pawl or ratchet 89, which is disposed in the plane of the ratchet-wheel 70, and is engaged by a spring 90, secured on one end of the link 86, for normally holding the ratchet 89, out of engagement with the ratchet-wheel 70.

Secured within the upper end of the sleeve 67, is a spider 91, provided with an integral upright tube 92, which projects upwardly into a wind carrot or wind vane 93, which is rotatably mounted upon the upper end of the sleeve 67. Secured on the tube 92, within the carrot 93, is one end of an arm or hand 94, the outer or free end of which is disposed between contact pins or terminals 95 and 96, mounted within the wind carrot 93. The terminal 95, is in circuit with the contact ring 72, by means of an insulated wire 97, and the terminal 96 is in circuit with the contact ring 73, by means of an insulated wire 98.

Rigidly secured within the pedestal 53, and below the plate 64, is a ring 99, provided with an integral cross-bar 100, having formed centrally thereon a recessed bearing cylinder 101, adapted to rotatably receive the lower end of a rod or shaft 102, which extends upwardly through the sleeve 67, the tube 92, and the carrot 93, as clearly shown in Figure 9, and has secured on the upper end thereof a wind-gauge or anemometer 103. Rigidly secured on the anemometer rod 102, below the plate 64, is the upper end of a centrifugal governor 104, the lower end of which is slidably engaged on said rod 102, and is provided with an insulating sleeve or collar 105, having a contact ring 106, disposed therearound and connected with the rod 102. Mounted upon the cross-bar 100, are three posts 107, 108 and 109, having respectively mounted upon the upper ends thereof a high speed brush 110, a moderate speed brush 111, and a low speed brush 112, the free ends of which bear against the insulation sleeve 105. The wires 41, 42 and 43, from the lamp groups 36, 37 and 38, are respectively connected to the posts 107, 108 and 109.

As shown in the wiring diagram of Figure 22, the anemometer rod 102, is connected by means of a wire 123, to a wire 113, one end of which is connected to the line wire 62, and the other end to the motor reversing mechanism 16ª. The switch gear 14, is connected by means of a wire 114, to the other line wire 115, to which the wire 52 is also connected. The arrow lamp group 35, is connected with the line wire 115, by a wire 116. The wire 44, from the brush 29, is connected to the solenoids 83 and 88. The solenoid 83, is connected by a wire 117, to the post 75, to which post the motor reversing mechanism 16ª, is also connected by a wire 119. The post 74, is connected to the motor reversing mechanism 16ª, by a wire 121, and to the solenoid 88, by a wire 122. The motor reversing mechanism 16ª, is also connected to the line wire 115, by a wire 124. The motor reversing mechanism 16ª, is disposed within the stator of the induction motor 16, and has the terminals 118, of the stator winding and the terminals 120, of the split phase starting coil connected to suitable motor reversing terminals within said mechanism. As shown in Figure 1, the line wires 62 and 115, lead into a main switch box 125, which may be located in any convenient position desired.

Figure 23 shows a fragmentary portion of an aviation route map 126, disclosing aviation lanes or routes across a certain territory or district 127, whereby an aviator may readily follow a certain route across country and know his relative position by following the designations or symbols on the cardinal direction indicators 48, of the various stations, in a territory over which the aviator is flying. To further facilitate cross country flying, an aviator, in addition to carrying a complete route map 126, may also have conveniently located in his airplane a map case 128, having a large opening 129, in the top thereof for disclosing an enlarged detail portion of a ribbon map 130, wound on rollers 131, disposed across the interior of the end portions of the map casing 128, and provided with knobs or handles 132, for rotating the rollers 131, to position any desired enlarged detail map portion 133, in the opening 129. By referring to the enlarged detail map portion 133, disclosed in Figure 24, it will be seen that each station is provided with a numeral "20" or other uniform symbol, to designate the particular territory in which the stations are located, and each station is further provided with a second symbol to identify the separate stations from one another. As disclosed certain of the stations are provided with a third symbol "C" to show that they are stations along a certain direct route or lane 134. Other stations which are not on a particular route or lane are scattered around in the territories or sections and are provided with indicators or arrows 135, which point in a direction to show the nearest direct route to the closest station to assist an aviator who has lost his way or has deviated from the main route or lane 134, to readily find his way back again.

The operation is as follows:

With an aviation station or field 1, equipped with a landing indicator or mechanism as described and as shown in Figures 1 to 22, inclusive, a safe landing may be made by a pilot either by day or night, or a pilot may readily determine a cardinal direction and his relative position as well as the geographical location of a station over which he is flying, in addition to ascertaining the relative direction and velocity of a wind blowing over the aviation field.

The arrow 32, on the wind direction and wind speed indicator 11, and the symbols on the cardinal direction indicator 48, may be painted red or any other color or colors to permit the same to be readily seen in the daytime and the lamp caps 33, or the lamps may be of any desired color, or combination of colors to produce an effective illuminated arrow and symbols at night when the lamps are burning. The arrow may be positioned on the turntable to point into the wind or in the direction of the wind. As shown in Figure 1, the arrow points into the wind Any other suitable type of indicator may be used in place of an arrow, if desired.

The operation of the turntable 11, and the motor 16, is controlled by the wind vane 93, which is rotatably mounted upon the sleeve 67, and may be rotated in either direction by the wind, thus moving either the terminal 95 or 96, into engagement with the hand 94, thereby establishing a circuit through the motor 16, in one direction when the hand 94, contacts terminal 95, or in the opposite direction when terminal 96, is contacted by the hand 94. It will be noted that the motor may be rotated in either direction by means of the motor reversing mechanism 16ª. Operation of the motor 16, of course, rotates the worm 15, and the worm wheel 13, thereby causing rotation of the turntable 11, into a position wherein the arrow 32, points directly into the surface wind blowing over the field. Rotation of the turntable 11, also causes a similar directional rotation of the switch gear 14, which is provided with teeth equal in number to those on the ratchet-wheels 69 and 70, respectively. As the switch gear 14, rotates the teeth thereof are intermittently brought into contact with the projection 30, of the brush 29, thereby making and breaking a circuit to either the solenoid 88 or 83, depending upon which of the terminals 95 or 96 is in contact with the hand 94. A circuit through either of the solenoids, of course, energizes the same and causes an inward movement of the solenoid core, thereby drawing the ratchet connected therewith into engagement with one of the teeth of its respective ratchet-wheel 69 or 70, to rotate the respective ratchet-wheel an amount corresponding to the rotation of the switch gear 14 and the turntable 11. Rotation of either one of the ratchet-wheels 69 or 70 causes rotation of the sleeve 67 and the hand 94, which in contacting the terminals 95 and 96, moves the wind vane 93, in the same direction as the direction of rotation of the turntable. It will thus be seen that the wind vane 93, and the turntable operate synchronously and are rotated in one direction or the other whereby the arrow 32, is always substantially parallel to said wind vane 93, and has the head thereof directed into the wind to indicate the direction in which a surface wind is blowing over the field. The wind vane is moved by the wind until the contacts 95 and 96, have the hand 94, disposed therebetween and out of contact with each thereof, in which position the wind vane 93, is positioned to point directly in the direction of the wind.

At night, or even in the daytime if desired, the lighting circuits to the lamp groups 35, 49 and 50 are closed by means of suitable switches mounted in the switch box 125, or in any other convenient position, thereby lighting the lamps of said groups whereby an aviator is apprised of a safe landing area, the direction that the surface wind is blowing over the area, the particular territory and the particular station of said territory over which he is flying, and in addition to the above information the aviator is also given a cardinal direction which is indicated by the position of the cardinal direction indicator 48, with respect to the wind indicator 11. An aviator being apprised of the necessary landing information may make a safe landing by first touching the undercarriage wheels on the turntable and then rolling off onto the field until the airplane is brought to a standstill. If, at night, the landing area is in use or is obstructed by an unseen pilot who has landed by heading directly into the wind, shortly before another pilot wishes to effect a landing, and has not had time to get his machine out of the normal landing area, then a field attendant at the pedestal 53, will turn the crank 55, to rotate the switch wheel 54, thereby alternately making and breaking the lighting circuits to the lamp groups 49 and 50, producing a flashing effect, thereby signalling a pilot in the air that the landing field is occupied near the wind indicator 11, and that it may be dangerous to land normally heading directly into the wind. While ordinarily an aviator would, if necessary, wait until the flashing signal ceased and the landing area was cleared, he might risk that the pilot who has landed, has landed normally or nearly so as indicated by the flashing signal, and that a safe landing may be made in another portion of the field by quartering to normal and landing on the wind indicator and rolling off to a practically safe unoccupied portion of the field. To make sure of a positively safe landing the aviator might land on the field a short distance from the wind indicator and then run toward the indicator until the airplane comes to rest. This kind of a landing could be considered a very safe one, since the area surrounding the wind indicator is practically always a safe and clear area. Being familiar with the signals given from the field the pilot can therefor readily select a substantially safe place on the field to land, to practically eliminate all chances of a collision, and thereby increase the factor of safety over that which would obtain if there were no flashing or danger signal given by the field attendant.

The anemometer 103, is adapted to be actuated by the wind blowing over the field. The wind, of course, strikes the anemometer cups thereby causing rotation of the rod 102, and the centrifugal governor 104, secured thereto to rotate therewith. The varying speed of rotation of the governor of course causes the governor weights to move outwardly away from one another by varying amounts, whereby the insulating sleeve 105, is raised or lowered to move the contact ring 106, thereof into engagement with the respective wind velocity brushes 110, 111 or 112, depending upon whether the wind has a high, a moderate or a low velocity. Contact of one of the brushes with the contact ring 106, establishes a circuit to the respective wind velocity lamp groups 36, 37 and 38, as the case may be, to light the lamps of said group, thereby indicating to an aviator the approximate velocity of the surface wind over the field. The direction of the arrow and the signals afforded by the lamp groups 36, 37 and 38, therefore, advise an aviator of the direction and approximate velocity of the wind that is blowing over the field in which he may desire to land. With the wind signals given an aviator with his machine crippled, or with the engine missing and in danger of stopping, could approach the field with the wind and then turn to land into the wind. On the other hand, if the engine was running smoothly the pilot can arrive at his destination and be advised of the surface wind direction and the approximate velocity thereof, he can then take advantage of the wind without figuring on practically anything else except the location of a landing area sufficient to accommodate his particular machine, since comparatively all the landing information desired is indicated by the device.

If a pilot finds himself within sight of two indicating means in separate fields, the wind signals of the respective fields will readily indicate the wind conditions prevailing over the fields, one of which may be very greatly to his advantage to select in order to effect a safe landing, if it were immaterial on which field he landed. In case the signals of both of the visible fields indicate a wind direction and velocity which are disadvantageous, the pilot may pass both of the fields and fly to another field that he knows exists, and that can be readily located from the information afforded by the location and the characteristics of the indicating means of the two indicators in view. A pilot flying over an indicator, by comparing the location of the cardinal direction indicator with respect to the wind indicator, is able to determine the direction in which his plane is flying, and thereby permit him to change or continue his course from the field over which he is flying to another possibly more desirable field, whose direction from that indicated he knows by the detail part of the map 126, before him, as indicated in Figure 24, or the pilot may be otherwise apprised of route layouts.

Since the characters or symbols on the indicator 48, are clearly discernible both by day and by night, an aviator flying over an indicator field can determine by means of the symbol 49, the particular territory or district in which the field is located. By noting the symbol 50, information is also given whereby the identity of the particular field can be determined. Additional symbols may of course be provided on the indicator 48, or if desired upon the wind indicator to indicate that a station is on a particular course or route, such for example as the Wilson Highway, from which information an aviator can determine his bearings, and consider the advisability of continuing his flight or effecting a landing. It is of course essential that a pilot must be able to read and understand the various symbols and signs afforded by the indicating mechanisms, in order that he may be aided in making a landing or determining his particular location when lost. For example, if an aviator has been following a certain route 134, as shown in the detail map portion 133, of Figure 24, and loses his way or gets off his course, he flies until he discovers a station, from the characters of which he may readily determine his bearings, and by consulting his maps may ascertain by means of the arrows 135, the direction and by markings on the maps the distance to the safest, perhaps unseen, station that leads back to the route 134, from which he has deviated. It will thus be seen that each station may be a unit of route indication, whereby a pilot may readily set a definite course to any desired destination.

As already described the different approximate wind velocities, at night, are indicated by means of the lamp groups 36, 37 and 38, the lamps of which are of different colors to properly indicate different wind velocities. During the daytime when the lamps of said lamp groups 36, 37 and 38 may not be as easily discernible, suitable signals may be arranged on the wind indicator, said signals being connected with the velocity brushes 110, 111 and 112, to be controlled by the contact ring of the governor 104.

During the day the lighting switches may be opened, since the various indicators or characters of the device are so formed and painted to permit the same to be readily discovered and read without the aid of illumination.

If preferred the wind direction indicator and the wind velocity indicator may be provided independently of one another in different parts of the field, or if desired either of said indicators may be omitted.

Where desired the wind indicator turntable 11, may be omitted and a wind indicator provided wherein a contact member may be actuated synchronously with the said vane by the motor to effect lighting of certain lamp groups on a stationary mounting, thus indicating the wind direction.

It will, of course, be understood that the shape, arrangement, coloring and other features of the various characters or symbols of the device, as well as the construction and form of the various operating parts may be considerably changed and varied without departing from the principles of this invention, and I therefore do not purpose limiting the patent granted except as otherwise necessitated by the prior art.

I claim as my invention:

1. An indicating device for aircraft landing fields, comprising a pointer, means controlled by the direction of the wind for positioning said pointer, electric light signals mounted on said pointer to move therewith, and means controlled by the velocity of the wind for controlling the lighting or extinguishing of said electric light signals.

2. In a wind indicating device, an arrow, a series of signals along said arrow at various distances from the point thereof, means for positioning the arrow in accordance with the direction of the wind, wind controlled means for selecting that one of said signals whose distance from the point of the arrow corresponds to the velocity of the wind, and means for operating the selected signal.

3. In a landing field, a signal located near the ground, within said field, at a distance from the boundaries thereof greater than the ordinary landing run of an airplane and readable at a distance above the field greater than any dimension of the field, and wind controlled means located at a height above the ground and controlling said signal, whereby it indicates the direction and velocity of the wind.

4. In an aviation field, a turntable flush with the surface of the field and having thereon indicating means visible from airplanes at a height above the field, whereby the position of the turntable is readily determined by the aviator, automatic means for rotating the turntable in accordance with the wind and means including signals on the turntable visible from airplanes at a height above the field, for indicating to the aviator the velocity of the wind.

5. The combination with an aviation field, of a landing platform for airplanes rotatably mounted on said field, an indicator on said platform affording a means for locating the same, and means for automatically rotating the platform to position said indicator to designate the direction of a wind blowing over the field.

6. A landing indicator embracing a turntable illuminated, indicating means thereon, and wind controlled means connected with said turntable and adapted to rotate the same into a position wherein said means will designate the direction and the velocity of the wind.

7. In a device of the class described the combination with a landing platform to receive aircraft thereon, of an indicator thereon descernible by day or night, a motor connected with said platform, a rotatable contact mechanism connected with said motor, and a wind controlled means on said mechanism adapted to be moved to close a circuit through the motor to operate the same to cause rotation of the platform into a position wherein the indicator designates the direction of the wind.

8. In a device of the class described the combination with a landing platform to receive aircraft thereon, of an indicator thereon discernible by day or night, a motor connected with said platform, a rotatable contact mechanism connected with said motor and with said platform, and a means rotatably mounted on said mechanism adapted to be actuated by the wind to close a circuit through the motor to simultaneously cause rotation of said platform and said mechanism into a position wherein the indicator will designate the direction in which the wind is blowing.

9. In a device of the class described the combination with a rotatable landing platform, of an indicator thereon, means for illuminating the same at night to afford a means for readily discerning the platform, a wind vane, means for supporting the same, and driving means set in operation by said wind vane to cause simultaneous rotating of said platform and said supporting means to properly position the indicator to indicate the direction in which the wind is blowing.

10. The combination with an airplane landing platform, of directional and velocity indicators thereon discernible by day or night, a driving mechanism connected with said platform, a rotatable means, a member thereon, a wind actuated mechanism rotatably mounted on said rotatable means to contact said member to cause said driving mechanism to simultaneously rotate said platform and said rotatable means into a position wherein the indicator will indicate the direction of the wind.

11. In a device of the class described the combination with an airplane landing platform, directional and velocity wind indicating means thereon discernible by day or night, and a wind controlled mechanism adapted to automatically rotate said platform in either direction into a position wherein said means will indicate the direction of the wind to assist an aviator in making a safe landing.

12. The combination with a field, of a rotatable landing platform thereon, wind directional and velocity indicators on said platform, a rotatable wind vane mechanism in another part of the field, means connecting the same with said platform, a driving mechanism connected with said platform and with said wind vane mechanism adapted to be set in operation by said wind vane mechanism to rotate said platform and said wind vane mechanism synchronously through said connecting means into a position in which the directional indicators will designate the direction of the wind.

13. In a device of the class described the combination with an airplane landing platform, of a plurality of means thereon to permit the platform to be readily located by day or night, and wind controlled mechanism adapted to rotate said platform in either direction and actuate certain of said means whereby one of said means will indicate the direction of the wind.

14. In an aviation landing field, two signals separated by a distance greater than the ordinary landing run of an airplane, and in a cardinal direction, one of said signals having characteristic indicia to designate the landing field and the other having indicating means to show the direction and velocity of the wind.

15. In a device of the class described, the combination with a rotatable landing platform, of directional and velocity indicating means thereon, and wind actuated means electrically connected with said platform and indicating means to cause rotation of said platform to position and cause said indicating means to indicate the direction of the wind actuating said wind actuated means.

16. The combination with an airplane landing device, of an indicator thereon, means for causing rotation of said landing device in either direction to position said indicator to designate the direction of the wind, and a mechanism connected with said landing device and supporting said means adapted to be rotated in either direction simultaneously with said landing device to position said indicator and said means in parallel relation to one another at all times.

17. The combination with an airplane landing device, of an indicator thereon, means for causing rotation of said landing device in either direction to position said indicator to designate the direction of the wind over said landing device, rotatable mechanisms for supporting said means, and means disposed between said landing device and said rotatable mechanisms adapted to be set in operation by the rotation of said landing device to cause rotation of said rotatable mechanisms in either direction simultaneously with said landing device to position said means and said indicator in parallel relation to one another at all times.

18. In an aviation landing field a signal at the landing place, a signal at a distance therefrom in a cardinal direction, said second signal including indicia characteristic of the geographical location of the landing field and means to cause one of said signals to indicate danger.

19. In an aviation landing field, a signal giving indicia characteristic of the identity of the landing field, a second signal located at the landing place, the distance between said signals being in a cardinal direction, and means associated with the first-named signal to indicate whether or not an airplane should land.

20. In a landing field, an airplane landing indicator comprising a turntable mounted at the surface of the field and carrying non-obstructing means to indicate the direction of the wind.

21. In a landing field a signal located at the ground and readable at a distance above the ground greater than the landing run of an airplane and wind controlled means for causing said signal to rotate to a position corresponding to the direction of the wind.

22. A landing field, a rotatable support therein at the surface of the field, automatic means for turning said support to position it according to the direction of the wind and a signal carried by said support and positioned by the turning thereof.

23. The combination with an aviation field, of a rotatable landing device, an illuminated indicator at said device, for locating the same said indicator being mounted on said device to rotate therewith and means for automatically rotating said device to position it according to the direction of the wind whereby said indicator will be made to assume a position showing the direction of the wind.

24. An aviation field having a landing indicator including a turntable at the surface of the field indicating means thereon to permit the indicator to be readily read by day or night and wind controlled means adapted to rotate the turntable into position wherein said indicating means will designate the direction of the wind.

25. In a device of the class described, the combination with a landing device of signalling means thereon to permit the device to be readily located by day or night and wind controlled mechanism adapted to rotate said device to cause said signalling means to indicate the direction of the wind.

26. In combination with an aviation field, a signal marking a landing place, said signal being so located that it will not obstruct a landing airplane, and means for causing said signal to indicate the direction of the wind.

27. The combination of directional and velocity indicators discernible by day or night, a rotatable support therefor, a driving mechanism connected with said support, a rotatable means, a member on said means, a wind actuated mechanism rotatably mounted on said rotatable means to contact said member to cause said driving mechanism to simultaneously rotate said support and said rotatable means into a position wherein the indicator will indicate the direction of the wind.

28. In a device of the class described, the combination with an airplane landing place of rotatably mounted directional and velocity wind indicating means near the level of the ground and near said place discernible by day or night, and a wind controlled mechanism adapted to automatically rotate said indicating means into a position wherein it will indicate the direction of the wind to assist an aviator in making a safe landing.

29. In a device of the class described, a landing place for air craft, a rotatable means associated with said place and near the ground for indicating the velocity of the wind, and wind actuated means for electrically controlling said indicating means to cause it to indicate the velocity of the wind and rotate to a position indicating the direction of the wind.

In testimony whereof I have hereunto subscribed my name in the presence of two subscribing witnesses.

ALFRED JOHN MACY.

Witnesses:
JULIA B. MACY,
JOHN E. MACY.